Feb. 10, 1970 J. L. BROWN 3,495,089
ALIGNMENT SENSING DEVICES UTILIZING LIGHT-EMITTING
SEMI-CONDUCTORS
Filed Oct. 11, 1965 2 Sheets-Sheet 1
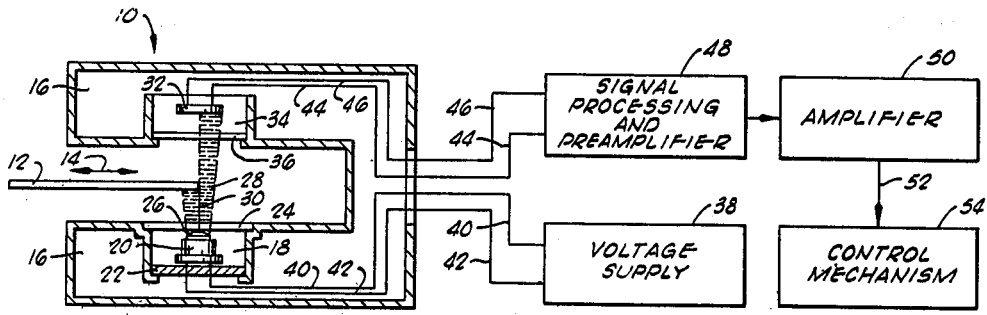
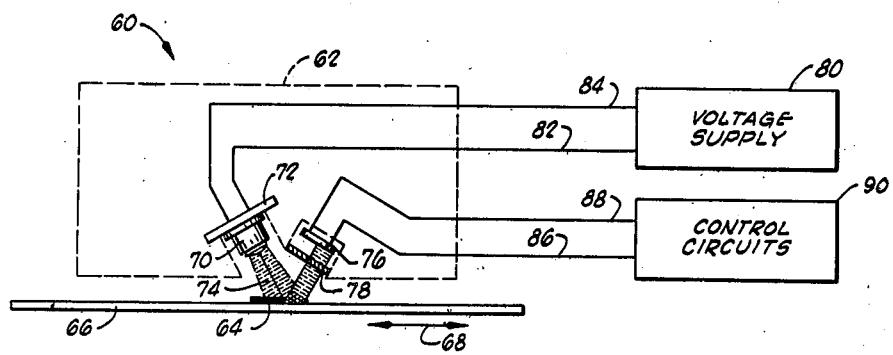
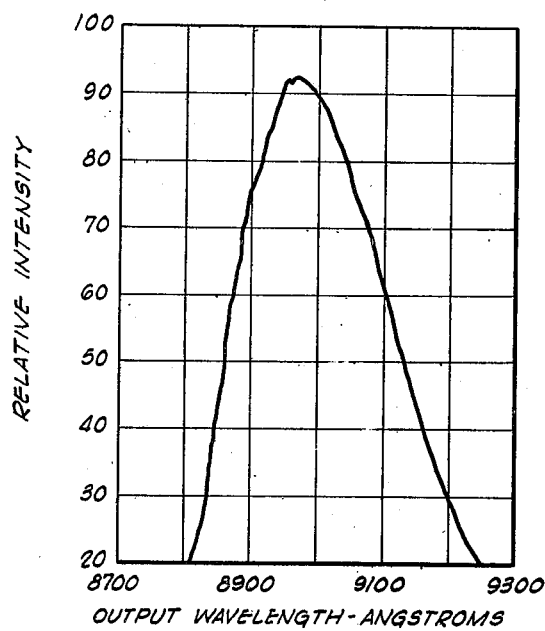
INVENTOR.
JERALD L. BROWN
BY
ATTORNEYS

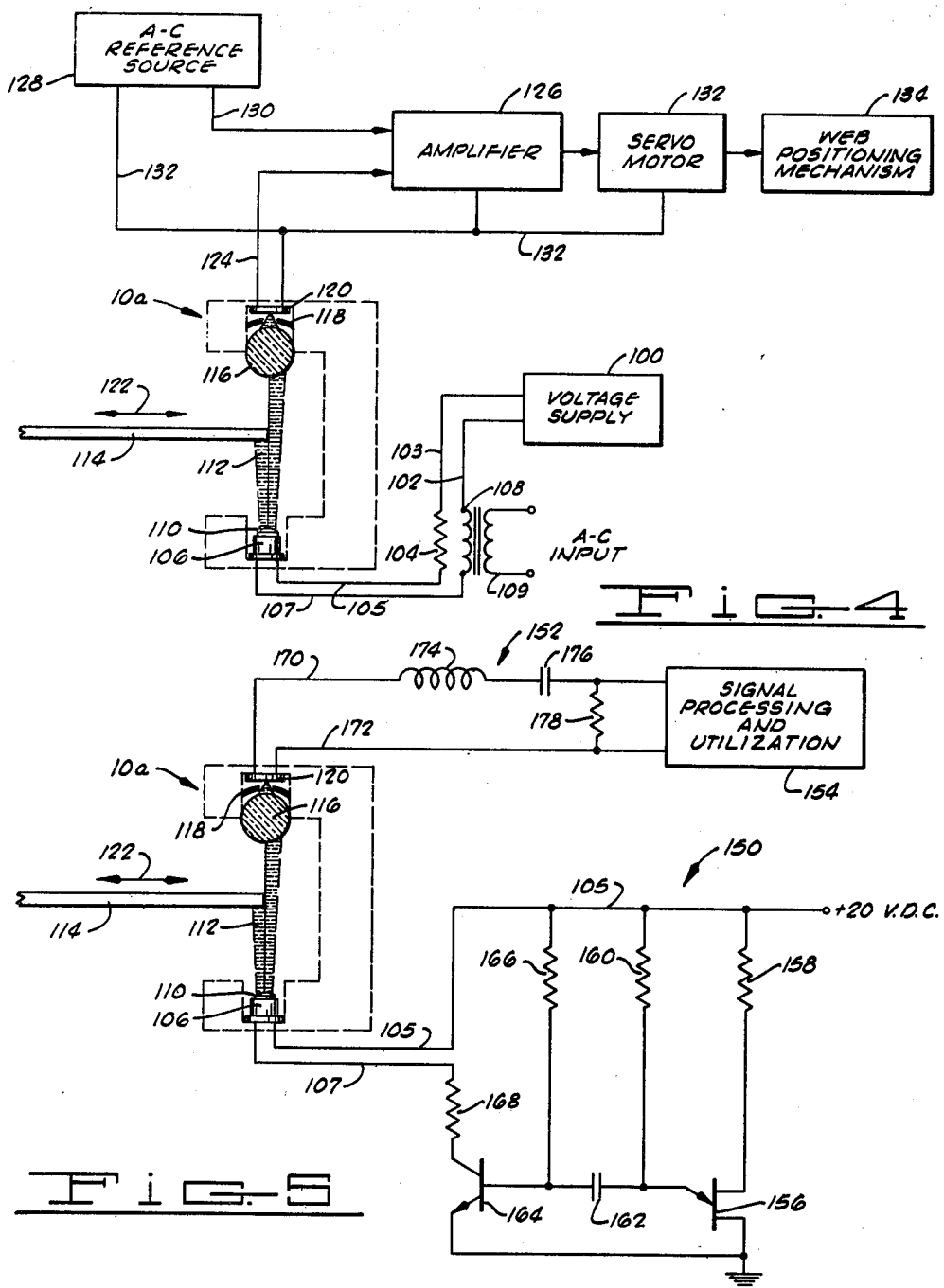

United States Patent Office 3,495,089
Patented Feb. 10, 1970

3,495,089
ALIGNMENT SENSING DEVICES UTILIZING
LIGHT-EMITTING SEMI-CONDUCTORS
Jerald L. Brown, Oklahoma City, Okla., assignor to Fife
Manufacturing Company, Oklahoma City, Okla., a
corporation of Oklahoma
Filed Oct. 11, 1965, Ser. No. 494,306
Int. Cl. G01n 21/30; H01j 39/12; G02f 1/28
U.S. Cl. 250—219                                    4 Claims

ABSTRACT OF THE DISCLOSURE

Apparatus for light sensing by utilizing preselected wave lengths of radiant energy, the apparatus comprising a light-emissive semi-conductive device which is stimulated to emit radiation of predetermined spectral characteristic along a sensing path, and radiation sensitive means responsive to energy of the similar spectral characteristic for providing a sensing output in accordance with detected variations affecting the radiation path.

---

This invention relates generally, as indicated, to improvements in the art of object alignment equipment; and more particularly, but not by way of limitation, the invention relates to photo-sensing heads employing narrow spectrum, radiant energy.

The particular device disclosed herein will have special utility in the field of web-guiding. In prior photo-electric sensing devices, the equipment has been subject to instability due to the pickup of ambient, interfering light from the surrounds wherein the equipment is being employed. Such things as window light, artificial fluorescent light, and spurious reflections from various activities in the environment, have tended to give an uncertain photo-sensed output, thus rendering the entire control system unstable.

Further, when using the conventional photo-electric sensing heads, it has been necessary to provide a reliable source of illumination for defining the object, web or whatever for which the equipment was being employed to control. This illumination is another source of trouble. Dust collection and age can cause slight variations in the amount of luminosity, such that the overall efficiency of the control equipment will be lessened. Hence, the present devices are somewhat limited and short lived as to reliable and adjustment-free operation.

The present invention contemplates a photosensitive device which employs narrow spectrum, radiant energy for continually registering the transmission or reflectance characteristics of a web or other object, the alignment of which is being monitored. In a more limited aspect, the invention contemplates the use of a semi-conductive light-emitting device as an illumination source which provides very narrow spectrum light in the near infrared region, and this illumination is then detected after transmission past or reflectance from said object by a photo-sensitive response element having a very restricted and matching spectral response.

It is an object of the present invention to provide a photo-sensing head employing narrow spectrum radiant energy.

It is another object of this invention to provide a photo-sensing head which produces a tracking indication of the edge, or other indicator, on or about an object and which will be immune to the effects of ambient light in the vicinity.

It is further an object of this invention to provide a sensing head employing a light-emitting diode as the illumination source, and a related photo-responsive element which has a narrow spectrum response characteristic similar to that of the source.

It is another object of the invention to provide a photo-sensing head utilizing infrared light for either transmission or reflectance determination of object alignment.

It is still another object of the invention to provide a photo-sensing head utilizing narrow-spectrum radiant energy which employs a coded illumination source.

It is yet another object of the invention to provide a photo-sensing head employing a coded illumination source and a photo-responsive element which is restricted in frequency response such that its output indication is due only to the coded illumination.

It is further an object of the present invention to provide a photo-sensing head which is free from extraneous ambient light, can be rendered immune from all interfering reflections, and can be constructed more compactly than similar sensing heads known heretofore.

It is still further an object of the present invention to provide a photo-sensing head having increased reliability due to freedom from susceptibility to mechanical shock and very long operating life.

Finally, it is an object of the present invention to provide a photo-sensing head which utilizes a more compact, rugged illumination source and a matched, narrow-spectrum illumination detector.

Other objects and advantages of the invention will be evident from the following detailed description when read in conjunction with the accompanying drawings which illustrate the invention.

In the drawings:

FIG. 1 illustrates a partially cut-away view of an exemlary showing of the light-transmission type of photo-sensing head with subsequent utilization equipment shown in block form;

FIG. 2 is a graph showing the spectral response characteristic of a particular type of light-emitting diode:

FIG. 3 is an exemplary showing of a reflected-light type of sensing head;

FIG. 4 shows a block diagram of a preferred form of photo-sensing head when used in web-positioning equipment; and, FIG. 5 shows an alternate use of the photo-sensing head wherein the illumination output is coded.

In FIG. 1, a transmitted-light sensing head 10 is shown in operative alignment about the edge of a web or other object 12 which is to be monitored with respect to its lateral position, that is, the position in the direction of arrow 14. The sensing head 10 is shown here as being a U-shaped member 16, however, it could be of any suitable design so long as the necessary photo-optic elements are afforded the proper edge view of the object 12.

The lower portion of member 16 is formed to have a recess 18 in which a semi-conductive light-emitting device 20 is positioned. The light-emitting device 20 is preferably mounted within a heatsink 22 of the conventional copper or aluminum type and, if desired, silicon heatsink compound may be applied to increase heat transfer to the dissipating members. A cover glass 24 is provided over the opening of the recess 18 which is mainly for the protection of the elements within the recess 18.

The light-emitting device 20 may be any one of the semi-conductive light emitters; however, as an example, the present description will be directed to a type known as the gallium arsenide diode. A commercially available diode which has been found to give the desired result is that known as the General Electric Type LED–10 which emits narrow-spectrum radiant energy in the near infrared region of the spectrum. The light-emitting diode 20 is capped with a lens 26 which allows an energy beam 28 which has a width of about 15° at the half intensity points. Thus, the beam 28 may be situated to have a cross-section covering about 7.5° outward from each side of the projection axis 30. In some special cases, the lenses and other optical components used in the device may be composed of special glass, rock salt or other of the well-known infrared refractors; however, as set forth herein, the special range is such that ordinary glass is effective.

The spectral response characteristic of the LED–10 light-emitting diode is shown in FIG. 2. It can be seen that the relatively narrow response lies between about 8800 angstroms and 9250 angstroms and this range is wholly within the near infrared region of the spectrum. This total response curve is representative of light output at room temperature and the output curve will become narrower and of decreasing wavelength as the diode temperature is reduced. The temperature factor is one to to be considered in accordance with the intended usage of sensing head 10.

A photo-voltaic cell 32 is positioned within a recess 34 in the upper arm of member 16. The recess 34 is of similar configuration and aligned opposite to the lower recess 18 such that the photo-voltaic cell 32 can be suitably mounted within the recess 18 in optical viewing relationship to the radiant energy beam 28. A particular type of photo-sensitive element which has been found to give good results in this application is a silicon photo-voltaic solar cell of Type SO510 E5, available from International Rectifier Corporation of El Segundo, Calif. This type gives particularly good spectral response matching with the light-emitting diode 20 (LED–10), however, many similar types are known in the art and it is only necessary to select one which will have the desired spectral response characteristic.

A filter glass 36, which may be of any suitable infrared passing substance, is mounted across the opening of upper recess 34 and serves to further narrow the spectral response of the photo-voltaic solar cell 32. This filtering is desirable because even though the light-emitting diode has a very narrow light output spectral band, the solar cell 32 is not so restrictive. Thus, the additional filtering of light as provided by the infrared passing filter glass 36 aids in enabling a more exact spectral match since only infrared light can pass into the recess 34 and light-emitting diode 20 is supplying a very narrow band of infrared energy. Further, the same band of radiant energy wavelengths are found to give a very high order of response in the silicon photo-voltaic solar cell 32 although its overall passband is somewhat wider.

A voltage supply 38 supplies energizing current via leads 40 and 42 to the light-emitting diode 20 which emits a radiant energy beam 28 in accordance therewith. A current value of 0.1 ampere has proven to be suitable. The photo-voltaic cell 32 then conducts in accordance with its response to the energy beam 28 via a pair of connecting leads 44 and 46 which lead to a signal processing and pre-amplifier apparatus 48. The control signal is then connected to an amplifier 50 and, finally, the amplified control signal is applied on line 52 to a control mechanism 54 which may be any type of apparatus which functions to correct or realign the object 12.

An energizing current limited by a suitable resistance to about 100 milliamperes through leads 40 and 42 from the voltage supply 38 is sufficient to provide good control and cause proper illumination output from the light-emitting diode 20. As to the signal processing and pre-amplification, there are many types of such apparatus which are well-known in the automatic control art, particularly, in the art of web guiding. Control mechanism 54 may be any of many well-known devices and could be of the pneumatic, hydraulic, or electrical types of positioning mechanisms.

In operation, the sensing head 10 will be operatively positioned over the edge of the object 12, such that when the infrared beam 28 is being emitted, the object 12 will partially (about half) block the beam. Thus, any lateral variations of the object 12 will cause the response of photovoltaic cell 32 to vary above and below a median response which will have been established as the proper or desired response. Any variations above or below this desired response will then be reflected as current changes on leads 44 and 46 to the signal processing and pre-amplifier stage 48. Thus, a control signal having the necessary error characteristics will be passed on to the amplifier 50 and then to the control or correction mechanism 54.

There is little danger of interference from ambient lighting in the work space where sensing head 10 is located since the control signal derived from photo-voltaic cell 32 is brought about in response to only a very limited region of the electromagnetic spectrum; that is, all of the radiant energy produced by the light-emitting diode 20 lies within a narrow spectral band while the ambient radiation, being spread continuously over a much wider band, is relatively weak in the band of wavelengths produced by the diode 20. As previously indicated, the solar cell 32 has a response to a slightly broader spectral passband than that bandwidth of the output of light-emitting diode 20 and it can be responsive to a small amount of interfering ambient light. However, the filter glass 36 effectively filters the unwanted components of ambient light so that the solar cell 32 is only responsive to the radiant energy beam 28.

FIG. 3 shows an alternative type of sensing head which could be used with apparatus similar to that shown in block form in FIG. 1. A sensing head 60, shown as comprising any suitable mounting or body member 62, is a reflected light-sensing head and it is only necessary to operatively position the sensing head 60 over the web or other object to be monitored. In the FIG. 3 illustration, it shows use with a mark or indicator 64 overlaying an object 66, the sensing head 60 to determine variations in movement of the indicator 64 in the lateral direction, as shown by arrow 68.

A light-emitting diode 70, mounted in a suitable heat-sink 72, is shown as being mounted in the body member 62 to project its beam 74 of radiant energy at the area including indicator 64 and object 66. A photo-voltaic cell 76 is also suitably mounted in reflecting relationship to the projection axis of light-emitting diode 70. The receiving unit may or may not include a filter glass 78, it being understood, of course, that best results will be obtained with the use of an efficient filter of the necessary spectral passband. The particular mounting and recess configuration in the body member 62 is entirely arbitrary and a design choice, therefore, the configuration as shown in FIG. 3 is merely exemplary.

A voltage supply 80 provides energizing voltage of about 20 volts to the light-emitting diode 70 via leads 82 and 84 and a suitable resistance is employed to maintain the loop current at about 100 milliamperes. The photo-voltaic cell 76 conducts its current indication as per the illumination on leads 86 and 88 to a desired assembly of control circuits 90. The voltage supply 80 may be the same type of circuitry as employed for voltage supply 34 in FIG. 1. Likewise, the control circuit 90 is but a generalized showing of circuitry similar to that of FIG. 1, that is, signal processing and pre-amplifier 48, amplifier 50, and control mechanism 54.

In the operation of the reflected light-sensing head 60, the head is operatively positioned over the object 66, having an indicator or suitable marker 64 thereon, so that lateral movement of the marker 64 will register an electrical error signal through the response of photo-voltaic cell 76. Depending upon the operation, this may be a movement of object 66 having indicator 64 permanently overlayed thereon, or it may be a case where 66 provides a background material or pattern while the indicator portion 64 is movable with respect thereto. This matter would depend upon the particular type of usage for which the photo-sensing and control system is to be used. So long as there is a sufficient contrast in the degree of reflectivity between the indicator 64 and the object 66, any movement within the beam 74 will cause a greater or lesser response in photo-voltaic cell 76. This respone, in turn, is conducted to the control circuits 90 wherein the variation of electrical characteristics is then processed to form a suitable error signal.

The apparatus of FIG. 4 shows another form of the transmitted light type of sensing head 10a as it may be used with particular equipment for web guiding. A voltage supply 100 provides bias or energizing power between leads 102 and 103. The lead 103 connects to a resistor 104 which is chosen to have a resistance value such that a current of about 100 milliamperes is applied on lead 105 to the light-emitting diode 106. The return lead 107 is connected through the secondary 108 of a modulation transformer to lead 102 and the voltage supply 100. The primary 109 of the modulation transformer is connected to a suitable A-C input voltage for the purpose of effecting modution of the light output from light-emitting diode 106. This may be any of several frequencies but it has been found that the sixty cycle line frequency gives especially reliable operation. Thus, an alternating component of current is apparent across the light-emitting diode 106 and it has been found that the radiation output is produced in a direct linear relationship to this alternating component of current.

The energized light-emitting diode 106, by means of its integral lens element 110, projects a beam 112 of narrow-spectrum, radiant energy (infrared) towards the edge of a web 114, half of the radiant energy passing the edge of web 114 when the system is in the proper response attitude. In some cases, as shown, this passing portion of radiant energy beam 112 may be refracted through a spherical glass element 116 and aperture stop or mask 18 where it is detected by the photo-voltaic cell 120. The spherical lens element 116 is characterized by an extremely short focal length and this focused radiant energy is limited to the desired beam by the mask 118. Hence, with mask 118 having the proper circular aperture for focusing that radiant energy originating at the light-emitting diode 106, any ambient light is excluded and the desired, modulated radiant energy is detected in the photo-voltaic cell 120. It should be understood, however, that the lens 116 is not absolutely necessary for proper guide detection operation.

The proper alignment of the sensing head 10a will place the head over the edge of a web 114 such that the infrared beam 112 will be about one-half cut off or blocked by the edge of the web 114. Thus, any lateral movement of web 114, that is, in the direction of arrow 122, will cause a variation in the response of photo-voltaic cell 120. This response of photo-voltaic cell 120 will provide an alternating output on line 124 which adheres closely to the modulation input waveform which energizes the light-emitting diode 106.

The A-C output on lead 124 is conducted to one input of an amplifier 126 while a suitable A-C reference voltage from the A-C reference source 128 is applied on a lead 130 to a differential input to the amplifier 126. Hence, the output from amplifier 126 will be a difference or error voltage which will have either a 0° or 180° phase relationship to the A-C reference voltage depending upon the lateral direction of web misalignment, and it will have an amplitude proportional to the amount of misalignment.

The A-C reference voltage should be chosen so that it will fall near a mid-range of the amplitude swing available on lead 124 from photo-voltaic cell 120 and it should be common connected with respect to the A-C voltage input at primary 109 of the modulation transformer. This will be a low value of voltage and can be calibrated in coordination with the amplifier 126 and photo-voltaic cell 120 for proper web alignment. The amplifier 126 would preferably include the difference amplifier input stages with further power output stages for amplifying the error voltage. A lead 132 provides a common connection for the several units of the A-C system.

The error voltage is amplified to a suitable level at the output of amplifier 126 for application to control the positioning of a servo-motor 132. This servo positioning is, in turn, employed to drive a suitable web-positioning mechanism 134. The servo-motor drive 132 and the web-positioning mechanism 134 may comprise apparatus which is presently known in the web-guiding art. Some exemplary forms of web-guiding apparatus would be shown in U.S. Patent No. 3,098,595; issued July 23, 1963, to J. J. Shelton; and entitled "Dithering Servo Valve and Web Guide System," and a second U.S. Patent No. 3,024,-955; issued Mar. 13, 1962, to Powers, and entitled "System for Centering a Moving Web." These patents show particular web-positioning mechanism and the servo control of such is well-known in the art.

For web-guiding operation, it is first necessary to locate the sensing head 10a about the edge of the web 114 such that it can be verified that the infrared beam 112 is about one-half cut off or blocked. Then the differential inputs to amplifier 126 are balanced or equal and there is no output voltage applied to the servo motor 132. This balancing can be effected by suitable potentiometer controls in either the A-C reference source 128 or the amplifier 126 in well-known manner. Then, any variation in the lateral direction 122 of web 114 will cause a corresponding variation in illumination and, consequently, a change in the output voltage of photo-voltaic cell 120 such that an error voltage will appear at the output of amplifier 126. This error voltage will have a phase and amplitude which is directly proportional to both the direction and amount of misalignment of the web 114, with respect to its pre-set position.

Referring now to FIG. 5 there is shown a somewhat more sophisticated usage of the transmitted light-sensing head 10a. However, it should be understood that the same coding or pulsing circuitry as shown in FIG. 5, can be used with the reflected light-sensing head 60 (see FIG. 3) just as well. This embodiment shows the transmitted light-sensing head 10a operatively positioned over a web 114 in the same manner as shown in FIG. 4, and like elements are numbered the same.

In general terms, the light-emitting diode 106 is pulsed to provide an intermittent infrared light output by a pulsing network 150. Thus, in addition to the extremely high spectral sensitivity of the sensing head 10a, there is the additional filtering effect of coded infrared light with subsequent frequency selective pickup by the photo-voltaic cell 120 which provides an output within the passband of filter 152. This highly selective error voltage is then applied to whatever the desired signal processing and utilization stages 154.

The voltage source or code generator 150 comprises a unijunction multivibrator 156 which has base No. 1 grounded and base No. 2 connected through a voltage dropping resistor 158 to a suitable voltage supply on a lead 105. In practice, a positive 20 volt D-C supply voltage has given good results. A first timing resistor 160 is tied between the positive voltage supply lead 105 and the emitter of the unijunction transistor 156, which emitter is connected through a timing capacitor 162 and then to the base of a transistor 164 of the NPN type. A second timing resistor 166 is connected between the positive supply lead 105 and the base of transistor 164. The emitter of transistor 164 is tied directly to ground while the collector is connected through a resistance 168 and via lead 107 to one terminal of the light-emitting diode 106. The second or return terminal of the light-emitting diode 106 is connected to lead 105, the positive voltage supply lead.

Thus, the unijunction transistor 156 conducts as a multivibrator with an RC combination consisting of resistor 160 and capacitor 162 setting the time duration when transistor 156 is in the non-conducting state, and a second RC combination of resistance 166 and capacitor 162 timing the "on" or conducting period of the unijunction transistor. Thus, the intermittently applied current to the base of transistor 164 will cause collector current to flow intermittently through resistor 168, thereby pulsing the illumination output of the light-emitting diode 106. The repetition rate frequency is one of a wide number of choices and may be made adjustable; however, the present device has given very good results at a pulse repetition rate of 20 kilocycles per second.

With coded or pulsed output of the infrared beam 112, the photo-voltaic cell 120 will produce a similarly pulsed output across leads 170 and 172. With lead 172 connected as the common lead, the other output lead 170 is connected through a coil 174 and a capacitor 176 to a desired assembly of signal processing and utilization stages 154. The values of coil 174 and capacitor 176 will be chosen to give the desired Q and passband as dictated by the choice of pulse repetition rate from the unijunction transistor 156. A resistor 176 can be connected across the input to the signal processing stages to develop the detection voltage. It should be understood that many equivalent types of filter would be applicable for this detection operation. It is foreseen that, in some cases, synchronous demodulation will provide a particularly desirable function.

The operation of this type of sensing head and its appurtenant circuitry, as shown in FIG. 5, would be essentially the same as the previously disclosed usages for the transmitted-light type of sensing head. The main difference being that the pulsing of the infrared illumination at a rapid and optimum repetition rate will serve to further reduce any possibilities of interference from extraneous signal pickup in or about the system. The repetition rate of the coding generator 150 can be set at any chosen value within very wide limits because the light-emitting diode of the type used herein is capable of repetition pulsing at extremely high rates, on the order of 1,000 megacycles.

Hence, by supplying the necessary combination as to resistors 160 and 166 and the capacitor 162, any desired repetition rate may be imposed in the system. It is understood, of course, that similar appropriate changes would be made as to the coil 174 and the capacitor 176, the series resonant bandpass circuit which provides the selective output from the photo-voltaic cell 120.

While the description herein is made with particular reference to the gallium arsenide type of light-emitting diode, it should be understood that such a photo-detection system would function equally as well with various other semi-conductive light emission devices. It is further contemplated that the application of semi-conductor laser elements of the scanatron type may offer still greater resolution and functional advantages in similar photo-detection circuitry.

The invention as set forth herein discloses novel photoelectric sensing heads which extend the scope and usage of such types of devices while, at the same time, enabling a more reliable, and more compact device. The sensing head, as disclosed herein, will allow lighter and smaller equipment to be constructed for use in material guiding and controlling operations of many types. The device would employ fewer electrically dependent elements thereby reducing the number of power consuming components and thus extending the system reliability since various sources of trouble are removed thereby. Further, the system is capable of being used in any environment for a web-guiding or other object alignment control operation because the photo-electric components of the system can be maintained absolutely free from the effects of interfering light and radiant energy reflections which may be present in the environment of the operation.

Changes may be made in the combination and arrangement of the elements as heretofore set forth in the specification and shown in the drawings; it being understood that, changes may be made in the embodiments disclosed without departing from the spirit and scope of the invention as defined in the following claims.

What is claimed is:
1. A photo-sensing apparatus for detecting the alignment of an object, comprising:
   a light-emitting diode positioned to direct a beam of narrow-spectrum, radiant energy past the edge of said object such that the beam is partially blocked;
   means for energizing said light-emitting diode;
   photo-sensitive means positioned to receive the radiant energy;
   spherical lens means for optically receiving the radiant energy passing the object edge and focusing said energy on said photo-sensitive means;
   aperture stop means disposed between said spherical lens and said photo-sensitive means; and
   means connected to receive the output from said photo-sensitive means and to produce a control signal having electrical characteristics which are available in accordance with said output.
2. A sensing device as set forth in claim 1 wherein said means for energizing comprises:
   a multivibrator for providing a pulsed D-C voltage to energize said light-emitting diode.
3. A sensing device as set forth in claim 1 wherein said means receiving the output comprises:
   electrical filter means receiving the output from said photo-sensitive means and having a pass-band including said multivibrator pulse frequency; and
   means receiving said filtered output for constituting a control signal having electrical characteristics which are variable in accordance with the output derived from said photo-sensitive means.
4. A sensing device as set forth in claim 1 characterized further to include an optical filter positioned over said photo-responsive means to limit the light reflected by said photo-responsive means to said narrow-spectrum radiant energy.

References Cited
UNITED STATES PATENTS

| | | | |
|---|---|---|---|
| 2,594,122 | 4/1952 | Cashman | 250—226 |
| 2,795,737 | 6/1957 | Large | 250—214 X |
| 2,801,340 | 7/1957 | Keonjian et al. | 307—260 |
| 2,962,596 | 11/1960 | Leimer et al. | 250—219 |
| 3,096,919 | 7/1963 | Snyder | 250—219 X |
| 3,132,253 | 5/1964 | Sorsen | 250—219 |
| 3,194,969 | 7/1965 | Chute | 250—216 |
| 3,316,409 | 4/1967 | Rockwell | 250—214 |

OTHER REFERENCES

M. F. Lamorte et al., P-N Junctions as Radiation Sources, July 13, 1964, Electronics, vol. 37, No. 20, pp. 61–65 relied upon.

Robert W. Keyes, Injection Lasers, Industrial Research, October 1964, pp. 46 to 51, 54 and 55 relied upon.

RALPH G. NILSON, Primary Examiner

T. N. GRIGSBY, Assistant Examiner

U.S. Cl. X.R.

250—202, 214, 217, 226; 307—260; 356—199